United States Patent [19]

Bergeron et al.

[11] Patent Number: 5,033,077
[45] Date of Patent: Jul. 16, 1991

[54] VOICE MESSAGE DELIVERY TO UNATTENDED STATION

[75] Inventors: Lawrence E. Bergeron, Trumbull; Paul G. Dulaff; Serge G. Faublas; Dennis S. Howell; Simon L. Howes, all of Monroe; Cobern E. McGraw, Milford; Mark Sekas, Orange, all of Conn.

[73] Assignee: Pitney Bowes Inc., Stamford, Conn.

[21] Appl. No.: 441,491

[22] Filed: Nov. 27, 1989

[51] Int. Cl.[5] .................... H04M 1/64; H04M 11/10
[52] U.S. Cl. .......................................... 379/67; 379/75; 379/89; 379/396
[58] Field of Search .................. 379/89, 88, 67, 75, 379/396

[56] References Cited

U.S. PATENT DOCUMENTS

| 4,612,416 | 9/1986 | Emerson et al. | 379/88 |
| 4,853,952 | 8/1989 | Jackmann et al. | 379/88 |
| 4,935,954 | 6/1990 | Thompson et al. | 379/89 |

FOREIGN PATENT DOCUMENTS

| 0144429 | 6/1987 | Japan | 379/88 |
| 0263963 | 10/1988 | Japan | 379/88 |

*Primary Examiner*—Thomas W. Brown
*Attorney, Agent, or Firm*—Nathaniel Levin; David E. Pitchenik; Melvin J. Scolnik

[57] ABSTRACT

Apparatus for apprising an unattended station of the presence of a voice message awaiting retrieval from a voice mail system. The voice mail system is connected to the unattended station, as by automatic telephone dialing, whereupon activating signals are transmitted to the unattended station to dispose that station in a signal receiving mode of operation. Display data then are transmitted to the unattended station when said unattended station is conditioned to receive signals. A disconnect operation is carried out to disconnect the voice mail system from the unattended station if the unattended station is not conditioned to receive signals, or subsequent to the transmission of the display data. Preferably, and in accordance with the preferred embodiment, the voice message is transmitted for recording at the unattended station if the display data are received successfully thereat.

22 Claims, 4 Drawing Sheets

VOICE MESSAGE DELIVERY TO UNATTENDED STATION

RELATED APPLICATION

Reference is made to patent application Ser. No. 441,490, filed Nov. 27, 1989, by Bergeron et al., entitled "PRIORITY VOICE MESSAGE DELIVERY SYSTEM", and assigned to the assignee of this application.

BACKGROUND OF THE INVENTION

This invention relates to voice message storage and transmission systems and, more particularly, to apparatus for use in a central dictation system in which priority voice messages are supplied to unattended stations of designated recipients by way of, for example, voice mail.

Central dictation systems are known wherein a central voice message store receives messages dictated by system authors for subsequent transmission to transcribe stations whereby those messages may be transcribed to written, or "hard copy" form. One example of a central dictation system is the Nucleus Central Dictation System, sold by Dictaphone Corporation. In the Nucleus system, the central store is comprised of magnetic tape which records, in analog form, messages which are dictated by system authors. Recorded messages are directed by supervisory control to particular transcribe stations.

Another example of a central dictation system is the Digital Express System DX7000, sold by Dictaphone Corporation, which utilizes digital techniques for converting dictated messages to digital form and then storing those digitized messages on typical digital storage devices. Details of this system are described in British Specification 2,201,863, published Sept. 7, 1988. Here too, stored messages subsequently may be reproduced and directed to particular transcribe stations under supervisory control. In a digital central dictation system, digital information characterizing each message may be stored with that message, or in a separate storage device or storage area and linked to that message. Such information typically identifies the type of message which is dictated, the identity of the author who dictated that message, and other parameters which are useful in following (or tracking) the progress of the storage and transcribe operations associated with that message. For example, the time of dictation, the particular department of which the author is a member, and other useful information may be generated either automatically, as when the author operates his dictate equipment, or manually, such as may be generated when the author operates a keyboard, keypad, or the like.

In some instances, certain dictated messages are of sufficient importance as to be transmitted to a recipient immediately after dictation such that the recipient is apprised of that message without delay. That is, it is important for the recipient to learn of that message even before it is transcribed into hard copy. For example, in the environment of a health care facility, such as a hospital, reports dictated by certain physicians or technicians with respect to particular patients or particular diagnoses may require prompt transmission to the attending physician of that patient and should not be subject to inherent delays associated with the transcription of those reports. However, in most conventional central dictation systems, both of the analog and digital type, such prompt communication of what is referred to herein as "priority messages" is not readily attainable. Often, auxiliary means are used to apprise a particular recipient of the fact that a priority message is awaiting his access. For example, the author of the message may have to communicate directly with its recipient, as by placing a separate telephone call to him which often may not be successful. Similarly, the mere communication of a priority message to a supervisor with the request that the message be relayed to the recipient may not be completed, either because the recipient is not readily available to receive that message, or because the supervisory operator may be occupied with other tasks, or the like.

Recently so-called "voice mail" systems have been introduced. A typical voice mail system is incorporated into many private telephone systems and provides a means for recording a message from one user of the system destined to another, in the event that the latter is not available to receive the message at the time it is transmitted. Accordingly, a central recorder is used as a temporary store of that message; and the intended recipient is apprised of the fact that a message is awaiting his retrieval. For example, the telephone equipment normally used in the system may be provided with an indicator which is energized when a "voice mail" message has been recorded and is awaiting retrieval by its recipient. Typically, the intended recipient responds to such an indication by accessing the central store, whereupon the recorded message is played back. To prevent the retrieval of a voice mail message by an unauthorized recipient, each recipient is provided with a "voice mailbox" which may be thought of as being analogous to a conventional mailbox. Voice mailboxes are accessed by a suitable "key", such as a particular password, user identification, or the like. Thus, in its general and intended form, voice mail is temporarily stored in a voice mailbox and retrieved only by a user authorized to access that mailbox.

In a typical voice message communication system, voice mail and central dictation have been treated heretofore as two separate, independent and distinct facilities. That is, a voice mail system has not been interactive with nor accessible from the central dictation system. Use of a voice mail system normally requires inputs and controls separate from those of a dictation system. Thus, in a health care environment of the type described above, a dictated message destined for an attending physician cannot be sent to him promptly unless a separate voice mail system is available and the author of the message accesses the voice mail system and creates another, separate message to be accessed by the attending physician.

Unfortunately, use of the voice mail system under the circumstances described above is time-consuming, laborious and often frustrating. The author may not have sufficient time to recreate his original report for the benefit of the voice mail system. Consequently, there is a high probability that important messages which should be transmitted immediately to a desired recipient nevertheless may not reach that recipient until the hard copy report is transcribed and physically delivered to him.

OBJECTS OF THE INVENTION

Therefore, it is an object of the present invention to overcome the aforementioned disadvantages and communicate important messages which are dictated in a central dictation system to desired recipients immediately, automatically and without the need for the author to re-dictate that message.

Another object of this invention is to provide apparatus for use in a central voice message dictation system for supplying priority voice messages to voice mailboxes which may be accessed by particular recipients.

A further object of this invention is to incorporate voice mail features into a central dictation system such that priority messages which are dictated by an author and are destined to particular recipients may be communicated promptly to those recipients.

An additional object of this invention is to transmit a priority voice message from a central store to equipment provided at a recipient's station, whether or not that station is attended.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for use in a dictation system of the type having a central voice message store for receiving and storing messages dictated by an author and for selectively playing back stored messages for transcription, which apparatus enables priority messages to be transmitted promptly to unattended stations of desired recipients. Certain of the stored voice messages are identified as priority messages which, in response to a priority message controller, are supplied to desired voice mailboxes whereat they are temporarily stored and subsequently transmitted to recipients intended to receive those messages.

In accordance with one aspect of this invention, a voice mailbox is connected via a telephone line to an unattended station, as by automatically dialing that station, whereupon activating signals are transmitted to dispose the unattended station in a signal receiving mode of operation. When the unattended station is conditioned to receive signals, display data are transmitted thereto and, if the display data are received correctly, the voice message is transmitted for recording at the unattended station. A disconnect operation is carried out if the unattended station is not conditioned to receive signals, or once the voice message is recorded successfully.

As a feature of this invention, preface signals are transmitted to the unattended station, and a reply signal detector detects reply signals returned therefrom representing that the unattended station is capable of responding to the activating signals. Preferably, the preface signals comprise preface tones and a warning message, the latter being adapted to apprise a human operator of the presence of a voice message awaiting retrieval and, in one embodiment, the warning message is a synthesized voice message.

As another aspect of this invention, acknowledgment signals returned from the unattended station, representing that the display data has been successfully received, are detected to enable the voice message awaiting retrieval to be transmitted for recording at the unattended station.

As a still further aspect of this invention, record completion signals returned from the unattended station when the voice message is recorded thereat are sensed; but the voice message is repeatedly transmitted up to a predetermined number of times if record completion signals are not sensed, whereafter the voice mailbox is disconnected from the called station.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
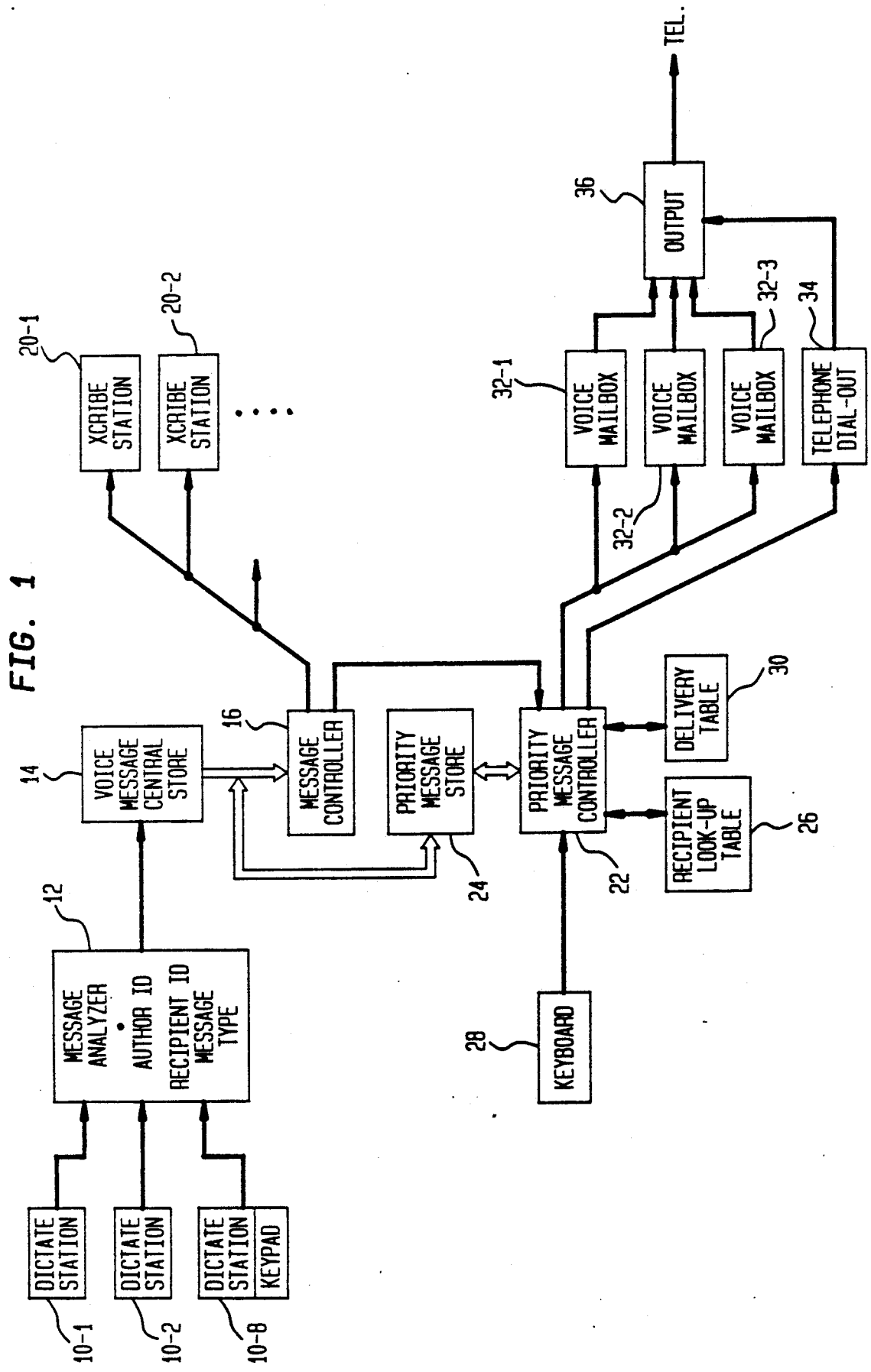
FIG. 1 is a block diagram of a central dictation system in which a particular message may be transmitted promptly and directly to a desired recipient.

FIG. 1 illustrates a central dictation system which is adapted to receive and store messages dictated by several authors having access to that system and to selectively play back the stored messages to transcriptionists for transcription to hard copy. The system shown in FIG. 1 also delivers to a voice mail system certain ones of the dictated messages which are identified as having high priority for prompt transmission to particular recipients, these messages being referred to herein as "priority messages". Accordingly, a voice message central store 14 is adapted to receive voice messages which are dictated from any one of several dictate stations, such as dictate stations 10-1, 10-2, . . . 10-8, and to transmit selected ones of the stored messages to any one of several transcribe stations 20-1, 20-2, etc. Central store 14 is coupled to the dictate stations by way of a switching arrangement (not shown) and a message analyzer 12 which is adapted to receive certain information from a dictate station that is operated to communicate with the central store. This information is compiled by the message analyzer to provide a voice message file for each dictated message. For example, and as is relevant to the present invention, message analyzer 12 is adapted to receive author identifying data which identifies the author of a dictated message, recipient identifying data which identifies the recipient, if any, of that message, and message type data which represents the type of dictated message, such as a report, a memorandum, a letter, etc. Other information associated with the dictated message also is provided, either from the dictate station or from internal programming of the message analyzer (which, preferably, includes a microprocessor). Such other information is not necessary for a complete understanding of the present invention and, thus, in the interest of brevity, is not described.

Figure 5A:
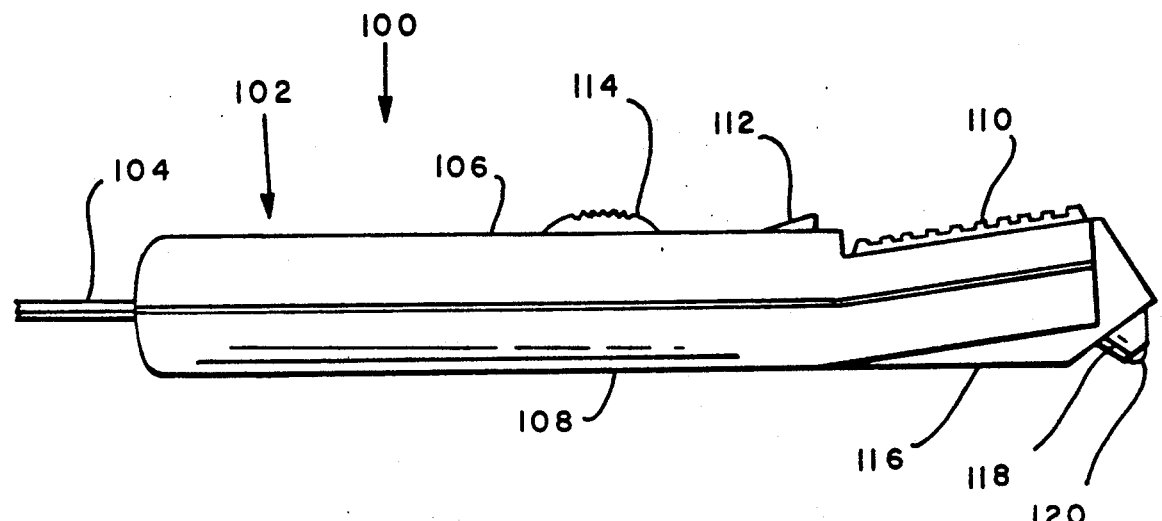
FIGS. 5A and 5B illustrate a combined hand-held microphone and bar code sensor that may be used in the system of FIG. 1.
Figure 5B:
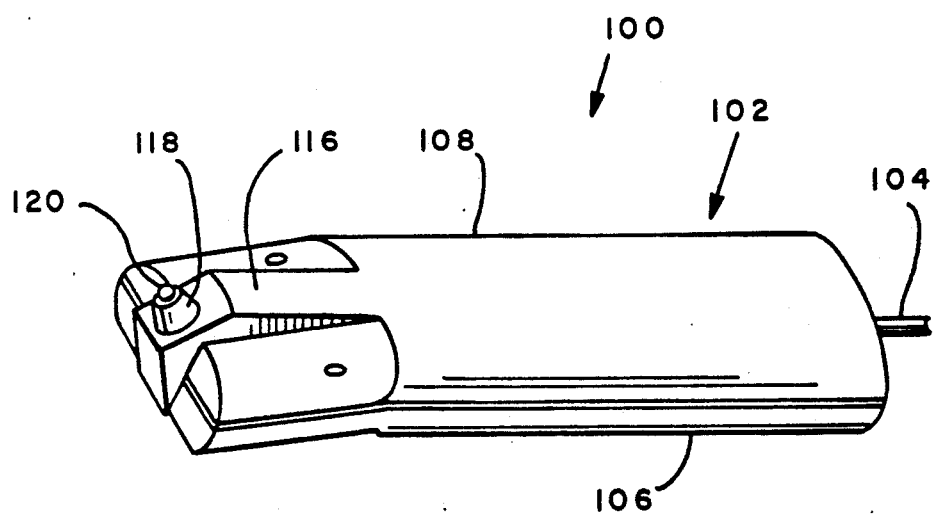

Each dictate station may include voice signal transmit and reproducing devices, such as a microphone and a loudspeaker, which may be incorporated into a single handset, as well as control circuitry used to initiate typical dictate functions, such as record, playback, fast forward, rewind, cue, and the like. One example of such a handset is illustrated in FIGS. 5A and 5B. In addition, suitable manually operable devices, such as a keyboard or, preferably, and as shown in FIG. 1, a keypad (for example, a telephone-type keypad), may be provided at some or all of the dictate stations for generating input data used to identify the recipient of a message and the message type. Such keyboard or keypad also may be used to identify the author of the message. However, in the preferred embodiment, each dictate station is associated with a predetermined author identifying code such that, when the dictate station is operated, that is, when it seizes central store 14, that author identifying code is transmitted automatically. Alternatively, the author identifying code is created internally by the message analyzer. An example of a suitable dictate station is found in the Connexions dictation system sold by Dictaphone Corporation, described, for example in U.S. Pat. No. 4,817,127, issued to Chamberlin et al.

Central store 14 preferably is a digital storage device, such as a hard disk drive, adapted to store voice message information in digital form. Accordingly, since voice messages are produced as analog voice signals, suitable analog-to-digital (A/D) converters are provided either at each dictate station 10-1, . . . 10-8 or at message analyzer 12 to digitize the voice message. The voice message file created by message analyzer 12 may be stored in central store 14 or, alternatively (or in addition), in a voice message file store whereat it is linked with its associated voice message.

A message controller 16 is adapted to reproduce each voice message stored in central store 14 and supply the reproduced voice message to a desired one of transcribe stations 20-1, 20-2, etc. Although only two transcribe stations are illustrated, it will be appreciated that several transcribe stations may be used such that several stored voice messages may be transcribed simultaneously. Message controller 16 may be included in a supervisory control station operable by a supervisory operator to select desired voice messages for reproduction and transmission to desired transcribe stations. For example, depending upon the type of message which is stored, the supervisory operator may determine that a particular transcriptionist is best able to transcribe that message. Hence, under control of the supervisory operator station, that message may be reproduced and supplied to a temporary store associated with the transcribe station utilized by the preferred transcriptionist. Alternatively, message controller 16 may interact with the preferred transcribe station to reproduce portions, or segments, of the message for transcription. One example of the manner in which dictated messages are stored and transcribed is found in the aforementioned DX7000 system.

FIG. 1 also illustrates priority message retrieval and transmission apparatus, whereby a voice message stored in central store 14 and identified as a priority message (or, alternatively, a voice message which satisfies other predetermined criteria), is supplied to a voice mail system for transmission thereover to a desired recipient. This priority message communication apparatus includes a priority message controller 22, a priority message store 24, voice mailboxes 32-1, 32-2, 32-3, etc. and telephone dial-out circuitry 34. Priority message controller 22 is coupled to message controller 16 and is adapted to receive information representing which of the messages stored in central store 14 are priority messages. Alternatively, the priority message controller may be supplied with the voice message file created for each voice message stored in central store 14 to determine whether the information contained in that file satisfies certain predetermined criteria to designate a particular message as a priority message. For example, if a voice message is identified as a priority message, and if the author thereof is provided with sufficient authorization to designate a message as having such "priority", and if the recipient is sufficiently identified, the voice message associated with the voice message file examined by priority message controller 22 is designated a priority message.

Controller 22 is coupled to priority message store 24 which, in turn, is coupled to central store 14. Controller 22 is adapted to transfer a voice message which is designated as a priority message from the central store to priority message store 24. In a preferred embodiment, the voice message simply is written into the priority message store but is not cleared or erased from central store 14. This permits the priority message to be transcribed to hard copy as well as communicated promptly to its intended recipient. Although not described in detail herein, it will be understood that control data are transmitted between store 24 and controller 22 to indicate when a priority message has, in fact, been transferred to the priority message store and the location in which that priority message is stored.

Priority message controller 22 also is coupled to a recipient look-up table 26 which is adapted to store communicating data associated with each recipient capable of receiving priority messages. For example, look-up table 26 may store the telephone number of each such recipient. In the event that the voice message file examined by controller 22 does not include the recipient's telephone number but does identify the recipient (for example, either by name or by identity code), the missing telephone number data may be retrieved from look-up table 26 and added to this voice message file. Although not shown, a suitable display, such as a video display, may be coupled to controller 22 for displaying at least certain information contained in the voice message file. A supervisory operator may observe this display to verify that the message file associated with a priority message identifies the author of that message, that the author has proper authorization to create "priority" messages, that the recipient has been identified, that the communication information (e.g. telephone number) of that recipient is identified and that the message type has been identified. If any of these (or other) information segments is omitted, for example, if the author has not supplied all of this information to message analyzer 12, such missing information is indicated. Priority message controller 22 is coupled to a keyboard 28 to permit the supervisory operator to furnish such missing information. Thus, the supervisory operator may complete a voice message file such that a priority message may be transmitted promptly to its recipient.

Priority message controller 22 also is coupled to a delivery table 30 which provides predetermined delivery information which may be established by the supervisory operator or may be inherent in the voice mail transmission system. For example, the delivery table may provide data representing the number of times communication with a recipient should be attempted in the event that the recipient does not respond to, for example, a telephone call directed to his telephone station. The delivery table also may provide information representing delay intervals which separate successive communication attempts. For example, such delivery information may represent that a recipient should be called every twenty minutes; and that a predetermined number of attempts (e.g. ten) should be made before terminating further attempts to transmit the priority message to that recipient.

Voice mailboxes 32-1, 32-2, 33-3, etc. are coupled to priority message controller 22 and are adapted to receive voice messages transferred thereto from priority message store 24 for temporary storage until the priority messages therein are transmitted to their respective recipients. In one embodiment, each voice mailbox is associated with an individual recipient, and each voice mailbox may store plural voice messages to be transmitted to that recipient. In an alternative embodiment, each voice mailbox may be shared with two or more recipients; and the priority message destined for one such recipient will not be transmitted to any other. For example, to access the voice message stored in such a voice mailbox, the recipient will be required to furnish his identification which, when matched to the recipient identifying information in the voice message file associated with that voice message, the voice message will be transmitted. In the absence of such a match, the voice message will not be transmitted and, thus, only the proper recipient will receive that message.

The voice mailboxes are coupled to output circuitry 36 which also is coupled to telephone dial-out circuitry 34. This dial-out circuitry is coupled to priority message controller 22 to receive communication data needed, for example, to initiate a telephone call to a recipient. It will be appreciated that the telephone dial-out circuitry is supplied with information in the voice message file representing the recipient's telephone number so as to initiate a dialing operation whereby a telephone call is placed to that recipient. In one embodiment, telephone dial-out circuitry 34 is used to initiate a dialing operation for each priority message stored in a respective voice mailbox. As will be described below, in the event that a priority voice message is not transmitted from a voice mailbox to its recipient, priority message controller 22 functions to supply another telephone number to telephone dial-out circuitry 34 to initiate yet another dialing operation in an attempt to reach a different recipient so as to transmit a priority voice message destined for that recipient. Accordingly, the dial-out circuitry may be thought of as scanning all of the priority message files stored in priority message controller 22 for the purpose of initiating telephone dial-out operations for each voice message. The foregoing process is repeated for those recipients that do not respond to a telephone call initiated by telephone dial-out circuitry 34.

Output circuitry 36 is coupled to a telephone line and functions to detect when a recipient answers a telephone call initiated by the telephone dial-out circuitry. In response thereto, the voice message destined for that recipient and stored in the recipient's voice mailbox is transmitted; and priority message controller 22 is apprised of successful transmission. The priority voice message then may be cleared from the recipient's voice mailbox. In addition, the voice message file associated with that voice message may be updated to indicate successful transmission of the priority message, the time at which that message was transmitted, and other data which may be useful in management reporting (e.g. the number of telephone calls that were placed to the recipient until he answered).

The manner in which the system illustrated in FIG. 1 operates now will be described. Let it be assumed that an author at dictate station 10-1 operates the dictate station to transmit a voice message for transcription. Message analyzer 12 detects that dictate station 10-1 is operated and, depending upon predetermined system criteria, begins to compile a voice message file. For example, the identity of dictate station 10-1 is entered; and if this dictate station is located within a particular department of a business organization, the identity of that department also is entered. Assuming that the dictate station is provided with a keypad, the author may operate that keypad to furnish additional data, such as author identifying data, message type data, and the like. Preferably, this additional data may be entered by the author at any time during dictation. Keypad signals, such as dual-tone multiple frequency (DTMF) signals may be transmitted as data signals; and these DTMF signals are easily discriminated by message analyzer 12 and used to compile the voice message file. Actual voice messages are stored in voice message central store 14.

At, or subsequent to, the completion of a message, message controller 16 establishes communication between any transcribe station 20-1, 20-2, etc. and central store 14. In one embodiment, the voice message file compiled by message analyzer 12 is supplied to message controller 16; and portions (or all) of the message file are transmitted to the transcribe station whereat they may be used to provide a hard copy of, for example, the author identification, the message type, the department identification, and the like. The voice message file also may be used by the message controller and other supervisory control systems (not shown) to provide a log of dictated and transcribed messages. Message controller 16 also interacts with the transcribe station so as to retrieve a voice message from central store 14 and transmit that voice message to the transcribe station whereat it is transcribed. Of course, the usual transcribe functions such as PLAY, REWIND, FAST-FORWARD, and the like may be executed.

Let it now be assumed that the author at, for example, dictate station 10-8, dictates a priority message which should be transmitted promptly to a particular recipient. The operation described above in connection with a message dictated for transcription is carried out, whereby message analyzer 12 compiles a voice message file and whereby the dictated message is stored in central store 14. In addition, it is assumed that the author operates his keypad to transmit priority identifying data and recipient identifying data to the message analyzer. In an alternative embodiment, message analyzer 12 may be such that when a particular recipient is identified, as by the operation of the author's keypad, the message being dictated is designated a priority message. Other criteria may be used to identify a message as a priority message. For example, all messages dictated by a particular author may be designated "priority" messages. In any event, when a voice message is identified as a priority message, its voice message file is supplied as a priority message file from message controller 16 to priority message controller 22. At this time, the voice message itself remains in central store 14.

Figure 2:
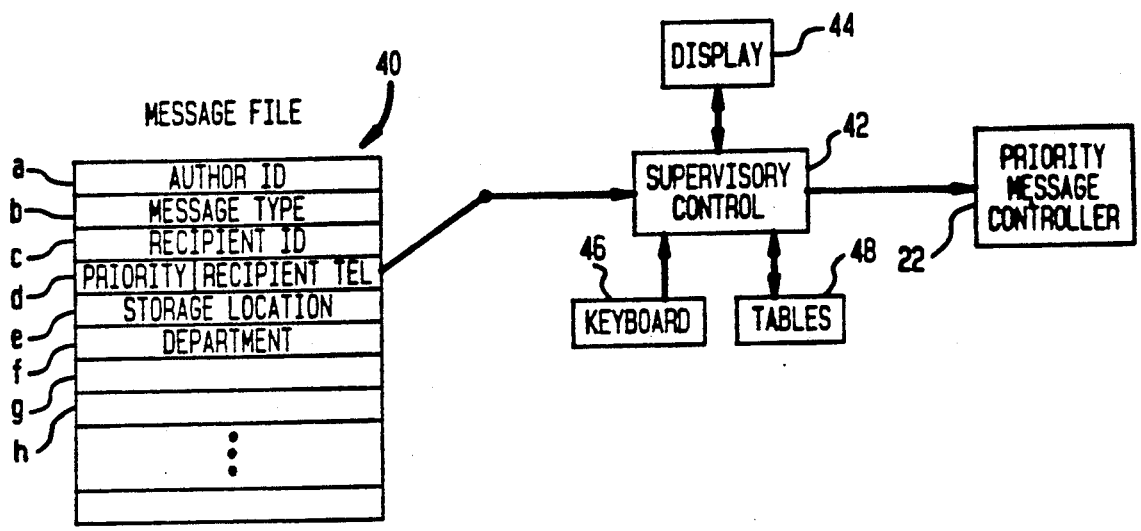
FIG. 2 is a block diagram representing a message file used with the present invention to indicate and transmit a priority message.

Referring to FIG. 2, a schematic representation of a suitable voice message file 40 is illustrated. The voice message file includes data segments, or fields, the information for which is supplied by a dictate station, by a keypad operated by an author and by predetermined system criteria. For example, data segment a represents the author identification; and this identification data may be supplied automatically when a particular dictate station seizes central store 14. In that case, each dictate station is assumed to be dedicated to a particular author. Alternatively, the author may operate his keypad so as to manually enter this author identification data.

Data segment b identifies the type of message which the author is dictating. For example, the keypad may be operated by the author to indicate a letter, report, memorandum, etc.

Data segment c identifies the recipient, if any, of the dictated message. Typically, recipient identification data is entered by the manual operation of the author's keypad if this message is destined to a particular recipient. For example, a memorandum may be dictated, transcribed and forwarded to the recipient whose identity is represented by data segment c. For the purpose of the present invention, the recipient identification indicates the particular recipient to which a priority message is destined.

Data segment d indicates whether the voice message linked to this message file is a priority message. For example, a priority flag may be set or reset to provide an appropriate indication of whether the voice message is a priority message. Data segment d also is provided with telephone data which represents the telephone number of the recipient of the voice message. This telephone number data is used by telephone dial-out circuitry 34 to dial the indicated telephone number so as to establish communication with the recipient identified by data segment c and thereby transmit to that recipient a priority voice message. To accommodate automatic dialing systems, the recipient telephone number data includes the usual codes which may be used by, for example, PBX equipment to dial the telephone number of virtually any telephone located anywhere in the world.

Data segment e identifies the location in central store 14 in which the voice message linked to message file 40 is stored. It will be appreciated that data segment e provides the link between the message file and the stored voice message. This data segment facilitates ready access to the stored voice message.

Data segment f identifies the department of a business organization of which the author is a member. It will be recognized that data segment f is optional and, if used, department identification may be entered manually, as by the operation of the author's keypad, or automatically.

Message file 40 may be provided with additional data segments g, h, etc. providing further information useful in monitoring the overall central dictation system. For example, such additional data segments may identify a transcriptionist who transcribes the voice message, the time at which the voice message is dictated, the time at which transcription begins, the time at which transcription is completed, the length of the voice message and the status of the condition of that message (e.g. whether it is in the process of being dictated, whether dictation is complete, whether it has been assigned to a particular transcriptionist, etc.). Other such data may indicate whether a priority message has been transferred to its recipient, the time of such transmission, the number of attempts made before transmission was successful, etc.

If data segment d of message file 40 indicates that the voice message is a priority message, this message file is duplicated for priority message controller 22. FIG. 2 indicates a supervisory control 42 included in (or coupled to) the priority message controller; this supervisory control being adapted to sense missing or incomplete data segments which may be completed by a supervisory operator. Supervisory control 42 is coupled to a suitable display 44, to a keyboard 46 and to tables 48. Keyboard 46 may be similar to aforementioned keyboard 28; and tables 48 may comprise tables 26 and 30, discussed above in conjunction with FIG. 1. Data segments a, b, c, etc. are scanned by supervisory control 42; and display 44 provides a visual display of the message file. Thus, the supervisory operator is apprised of any data segments which are missing or incomplete; and keyboard 46 may be operated to supply the missing information. In one embodiment, if a recipient is identified by data segment c, but if the telephone number of that recipient is not entered in data segment d, tables 48 may be accessed in response to the sensing of missing information to retrieve the telephone number of the identified recipient. Of course, if such telephone number information is not stored in tables 48, keyboard 46 may be operated by the supervisory operator to enter this information in message file 40. Similarly, other variable data segments may be supplied with information by the supervisory operator. Supervisory control 42 scans successive priority message files for this purpose.

Another function carried out by supervisory control 42 is to identify those voice messages designated as priority messages, but whose authors, as represented by data segment a, are not authorized to dictate priority messages. A supervisory operator may, nevertheless, conform that this voice message should be transmitted as a priority message. Still further, supervisory control 42 may be operated to enter or modify communication delivery information stored in, for example, delivery table 30. For example, the supervisory operator may actuate keyboard 46 to provide information representing the number of times a telephone call is to be placed to a recipient before further attempts are discontinued, and information representing the delay between successive attempts to place that call. As mentioned above, this communication delivery information is utilized by telephone dial-out circuitry 34.

If message file 40 is complete, or once missing or incomplete information is furnished by the supervisory operator, priority message controller 22 sends a suitable signal to message controller 16 for reading the voice message stored at the central store location identified in data segment e, which voice message then is written into the same (or corresponding) location in priority message store 24. For convenience, data segment e of message file 40 stored in priority message controller 22 is updated to identify the location in which the priority voice message is stored in priority message store 24. Then, this voice message is supplied to a particular one of voice mailboxes 32-1, 32-2, etc., to which the recipient identified in data segment c has access.

Figure 3:
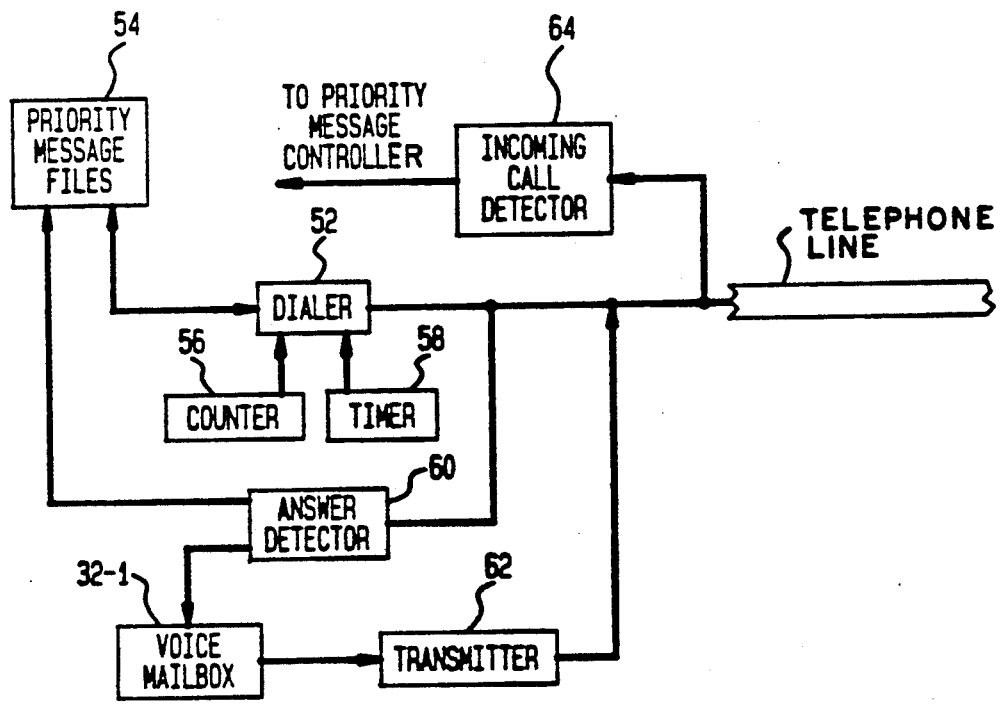
FIG. 3 is a block diagram of apparatus used to transmit a priority message to its recipient.

Referring to FIG. 3, the manner in which telephone dial-out circuitry 34 operates to establish communication with the intended recipient of the priority voice message stored in a voice mailbox now will be described. It is assumed that dial-out circuitry 34 includes a dialer 52, a counter 56 and a timer 58; and it is further assumed that dialer 52 is responsive to particular data segments of each of several message files 40. These data segments, to be described, and the message files in which they are contained are represented in FIG. 3 as priority message files 54.

Dialer 52, which may be similar to many conventional dialing systems that are commercially available, receives from priority message files 54 the telephone number of a remote telephone station to be dialed and the time (e.g. the time of day) at which the next preceding dialing operation was carried out. It is assumed that the preceding dialing operation did not succeed in establishing communication with the recipient. That is, it is assumed that a previous telephone call was not answered. The priority message files also supply to the dialer an indication of the number of prior unsuccessful attempts that had been made.

Based upon this information supplied to dialer 52 from the priority message files, the recipient's telephone number is dialed. Dialing signals, which may be tone or pulse signals, are transmitted over the telephone line to the remote telephone station. If the remote telephone is answered, an answer detector 60 updates priority message files 54 such that this message file no longer is supplied to the dialer. That is, it is assumed that, upon answering the outgoing telephone call initiated by dialer 52, there no longer is a need to effect subsequent attempts to establish communication with the recipient.

However, if the outgoing telephone call is not answered, for example, after a predetermined time duration or after a predetermined number of ringing signals is sensed, dialer 52 terminates this outgoing telephone call and counter 56 is incremented. The incremented count is stored in this priority message file as is the time at which this attempt was made to communicate with the recipient. If this updated count of unsuccessful dial-out attempts for this particular priority message are not initiated. Assuming, however, that this number of unsuccessful telephone calls has not been reached, as timer 58 is updated to represent the present time of day, this updated time is compared to the time of last dial-out stored in the priority message file. When the difference between these times is equal to or greater than the predetermined delay interval between successive dial-out attempts, dialer 52 is actuated once again to initiate yet another telephone call to this recipient.

It is appreciated that priority message controller 22 may be used to compare the present time of day to the time representing when the last dial-out attempt was made.

Let it be assumed that during one of these dial-out operations, the recipient answers the telephone call. As mentioned above, answer detector 60 inhibits further attempts to telephone this recipient, unless this recipient is identified in a new priority message file. For example, message file 40 may include a fail/success flag which is set when a telephone call to this recipient should be initiated and reset to prevent further telephone call attempts if a call is answered. In addition, answer detector 60 triggers the voice mailbox in which the priority voice message intended for this recipient is stored, such as voice mailbox 32-1. The voice message then is read from this voice mailbox and transmitted to the recipient by way of suitable transmitter circuitry 62. The transmitter circuitry preferably includes digital-to-analog converters, modulators and impedance matching circuits by which an audible voice message is generated in response to the digital voice message stored in voice mailbox 32-1. The transmitter circuitry may be common to several voice mailboxes and operated when a voice message is transmitted from one of those voice mailboxes to the called recipient.

In one embodiment of this invention, answer detector 60 includes verifying circuitry to verify that a telephone call is answered by the recipient to which the priority voice message is destined. For example, a synthesized voice message may be transmitted to the remote answering party to apprise him of the fact that a message awaits retrieval and to invite him to enter a suitable identification code, as by operating the keypad at his answering telephone. When the answer detector senses that the proper identifying code has been entered at the remote telephone, voice mailbox 32-1 then may be triggered.

In another embodiment, when a telephone call to a remote telephone station is answered, suitable indications, such as predetermined tone signals, may be transmitted, apprising the remote party that a priority message is stored in his voice mailbox and is awaiting retrieval. In this embodiment, the telephone call to the remote telephone station then is terminated. Hence, to retrieve the priority voice message from his voice mailbox, the recipient must initiate a telephone call to the voice message system which then operates in a manner similar to conventional voice mail systems to transmit the voice message stored in his voice mailbox.

It is appreciated that the system illustrated in FIG. 1 is intended to be used with particular, authorized users. It is further appreciated that the recipient of the priority message may be one of these users. If the recipient is not situated at the telephone station which is called by dialer 52, it is likely that he will not receive any priority message destined to him, unless he accesses the voice message system. As illustrated in FIG. 3, an incoming call detector 64 is coupled to the telephone line to detect incoming telephone calls that may be placed by users of the system. For example, the incoming call detector may be responsive only to predetermined telephone numbers known only to system users. The incoming call detector responds to an incoming telephone call to connect the remote calling party to priority message controller 22. When this telephone number is called, the remote user enters suitable identifying data, such as by operating the keypad at his telephone set, in response to a synthesized announcement transmitted to him, inviting such operation.

Priority message controller 22 responds to this user identification to scan priority message files 40 to determine whether the identification of the remote user matches the recipient identification in data segment c and, if so, whether the priority flag in data segment d is set. Thus, the priority message controller determines whether a priority voice message is awaiting retrieval by the remote calling party. If so, the voice mailbox in which this priority message is stored is triggered to transmit that message to the calling party.

Similarly, if a user of one of the dictate stations seizes central store 14, message controller 16 scans the message files linked with the voice messages stored in the central store; and if any stored voice message is a priority message intended for this user, it is played back to him via the dictate station.

In a preferred embodiment, the recipient of a priority message is provided with telephone apparatus of the type known as the Connexions telephone system sold by Dictaphone Corporation. This telephone instrument includes a voice recorder, such as a magnetic tape recorder for recording analog voice signals, and a visual display for displaying text messages. Such a telephone instrument may be operated in an unattended mode to receive and record voice messages transmitted thereto from any one of the voice mailboxes shown in FIG. 1.

The manner in which telephone dial-out circuitry 34, or the manner in which the apparatus illustrated in FIG.

Figure 4:
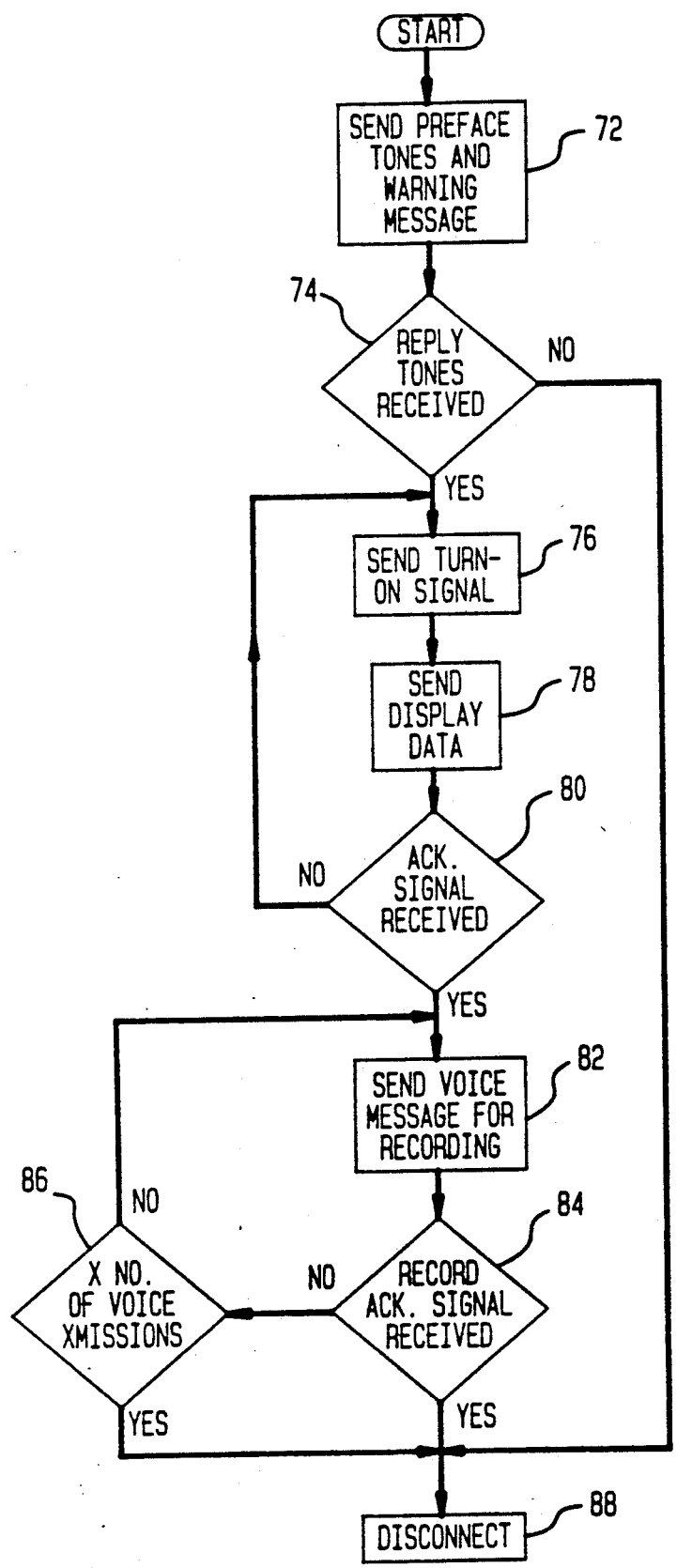
FIG. 4 is a flow chart representing automatic priority message transmission to an unattended station.

3 cooperates with such a telephone instrument to transmit a priority voice message thereto now will be described in conjunction with the flow chart shown in FIG. 4. This flow chart represents the operation of a microprocessor incorporated into or used with the communicating apparatus shown in FIGS. 1 and 3.

It is assumed that the telephone number of the recipient for which a priority message is destined has been dialed; and that this telephone call is answered. The microprocessor routine illustrated in FIG. 4 commences with instruction 72, whereupon preface tones and a warning message, such as a synthesized voice message indicating that a priority message is to be transmitted to the recipient, are sent over the telephone line to the answering station. Inquiry 74 determines if reply tones are received from the called station. If the called station is not an unattended Connexions telephone instrument, or compatible telephone device, reply tones are not received. In that event, inquiry 74 is answered in the negative; and the routine advances to instruction 88 to disconnect the telephone connection. However, if the called telephone station is an unattended Connexions telephone instrument, that instrument responds to the preface tones to return reply tones to the communicating apparatus of FIG. 1 (or FIG. 3). It will be appreciated that the synthesized voice message transmitted by instruction 72 serves to apprise an operator who may answer the unattended Connexions telephone that a voice message is awaiting retrieval.

If inquiry 74 is answered in the affirmative, the routine advances to instruction 76 to transmit a turn-on signal to the remote telephone station. This signal is of a predetermined tone (or combination of tones) which turns on the voice recorder at the Connexions telephone instrument. The tone (or tones) also functions to activate the display at the telephone instrument. Thereafter, instruction 78 is executed to transmit display data to the called telephone. This data is transmitted as a combination of tones representing ASCII characters corresponding to particular data segments included in a voice message file. For example, the display data provides indicates of a priority message, of the author of the voice message to be transmitted, of the date and time of transmission, and of other information which may be useful to the recipient, such as the type of message, the department from which the message originated, etc.

It is expected that this display data is received by the telephone instrument, resulting in a corresponding text display to apprise the recipient of the priority message. The routine then inquires, at 80, if acknowledgement signals have been received from the remote telephone instrument, acknowledging successful receipt of the display data. If this inquiry is answered in the negative, the routine returns to instruction 76; and the microprocessor cycles through the loop formed of instructions 76 and 78 and inquiry 80. However, if the displayed data is received successfully and if acknowledgement signals are returned to the communicating apparatus illustrated in FIGS. 1 and 3, inquiry 80 is answered in the affirmative.

Thereafter, instruction 82 is carried out to transmit the voice message stored in the voice mailbox to the remote telephone instrument. It is expected that this voice message is received and recorded by the unattended telephone instrument. At the completion of the voice message, which may be indicated by the transmission of suitable end tones, it is expected that acknowledgement signals will be returned by the remote telephone instrument to indicate that the voice message has been successfully received and recorded. Accordingly, the routine advances to inquiry 84 to sense if such record acknowledge signals have been received. If they are, instruction 88 is carried out to release the telephone line now that a successful recording of the priority message has been made at the called telephone instrument.

However, if inquiry 84 is answered in the negative, that is, if record acknowledge signals have not been received, inquiry 86 is carried out to determine if a predetermined number of voice message retransmissions have been made. If not, instruction 82 is repeated, whereupon the voice message which had been transmitted previously from the voice mailbox is retransmitted. The microprocessor cycles through the loop formed of instruction 82 and inquiries 84 and 86 until either a record acknowledge signal is received from the remote telephone instrument or the predetermined number of voice message retransmissions has been made. If either inquiry 84 or inquiry 86 is answered in the affirmative, the communication apparatus illustrated in FIG. 1 (or FIG. 3) is disconnected from the telephone line.

Turning now to FIGS. 5A and 5B, one embodiment of a suitable handset that may be used at the dictate stations shown in FIG. 1 is illustrated. FIG. 5A is a side view of a hand-held microphone; and FIG. 5B is a bottom view thereof. The illustrated handset 100 is comprised of a housing 102 which contains electrical circuitry coupled to message analyzer 12 (FIG. 1) by suitable electrical connectors shown generally as connectors 104. Housing 102 includes an upper surface 106 and a lower surface 108, the latter being illustrated in greater detail in FIG. 5B.

As is apparent from FIG. 5A, housing 102 contains a microphone; and although not shown, a suitable aperture is provided in the housing to permit voice signals to be detected by and converted into electrical audio signals by that microphone. Preferably, housing 102 also contains a loudspeaker 110; and a grillwork is provided to shield the loudspeaker from damage.

Functional switches, known to those of ordinary skill in the dictation art, are provided in housing 102; and these switches are manually operable to control various dictation functions. Examples of such switches are shown as banks of switches 112 and 114, wherein bank 112 may include a fast-forward switch, operable to effect a fast-forward operation, and one or more cue switches, operable to indicate the end of a letter, report, or the like, as well as to indicate the location in a voice message at which special instructions are recorded. Bank 114 includes a record switch, operable to effect a recording operation, a rewind/play switch, operable when actuated to effect a rewind operation and, when released, to dispose the dictation system in a playback operation whereby previously recorded dictation may be reviewed. Bank 114 also includes a stop switch operable to terminate any other operation which had been initiated by the actuation of a switch included in bank 112 or in bank 114. Such functional switches are sufficiently known to those of ordinary skill in the art and further description thereof is unnecessary.

As shown, housing 102 is formed with a relatively small upward angle, whereby speaker portion 110 appears to be raised when viewed in the side elevational view of FIG. 5A. Lower surface 108 of housing 102 is provided with an extension 116 integrally formed therewith. As best shown in FIG. 5B, extension 116 is adapted to receive and mount a barrel-shaped housing 118 which protrudes from the lower surface of housing 102. Barrel-shaped housing 118 receives a bar code sensor 120 which includes suitable optics and photo-sensing devices for detecting the so-called UPC bar code indicia typically provided on various products well known to consumers. Bar code sensor 120 may be of the type including a light emitter, such as an LED, or the like, and a photo-optical detector, such as a photo-transistor, or the like. Alternatively, bar code sensor 120 may include a laser device and photo detector. In the former embodiment, bar code indicia are sensed by advancing bar code sensor 120 across such bar code indicia while the sensor is in physical contact therewith. In the latter embodiment, physical contact between the sensor and the bar code indicia may be avoided.

The combined microphone/bar-code-sensor shown in FIGS. 5A and 5B finds ready application in the environment of a health care facility. In such environment, reports and memoranda relating to diagnoses and patient conditions often are dictated while viewing an X-ray, observing a diagnostic test, or the like. It is most common for patient identification, as well as other pertinent information, to be represented on that X-ray, diagnostic test, or the like, in the form of a bar code. Thus, rather than operating a keypad to create and transmit such information to message analyzer 12, as discussed above in conjunction with FIG. 1, all that need be done is to scan such bar code indicia with sensor 120 mounted on hand-held microphone unit 100. If such bar code indicia includes the identity of the intended recipient of a voice message, handset unit 100 now serves two important functions: it generates recipient identifying information and it also generates the voice message to be transmitted to that recipient.

While the present invention has been particularly shown and described with reference to a preferred embodiment, it will be readily appreciated that various changes and modifications may be made without departing from the spirit and scope of the invention. For example, rather than transmitting synthesized audible messages as warning indications, predetermined tone signals which will be recognized by the recipients thereof may be used. As another example, priority message store 24 may be deleted; and both message controller 16 and priority message controller 22 may interact with a single central store 14. In the preferred embodiment, central store 14 includes one or more hard disk drives, known to those of ordinary skill in the art. However, other suitable digital storage devices may be used. As yet another alternative embodiment, once telephone communication with a particular recipient of a priority voice message has been made, it may turn out that the recipient does not fully receive or understand the voice message transmitted to him via the voice mailbox. In that event, a repeat signal may be transmitted, as by operating a predetermined pushbutton on his telephone keypad, such as button "*", whereupon the voice message simply is retransmitted. As yet a further alternative, although telephone communication with recipients has been described, other conventional modes of communication may be used, such as radio transmission, whereupon voice messages stored in the voice mailboxes may be modulated and transmitted as radio signals. Still further, if telephone communication is adopted, it is understood that a recipient's telephone station may be a remote station or may be simply an extension included in a PBX system.

It is intended that the appended claims be interpreted as including the embodiment described herein, the alternatives mentioned above, and all equivalents thereto.

What is claimed is:

1. In a voice mail system, apparatus for apprising an unattended station of the presence of a voice message awaiting retrieval, comprising: connection means for connecting said voice mail system to said unattended station; turn-on means for transmitting activating signals to said unattended station to dispose said unattended station in a signal receiving mode of operation; display transmit means for transmitting display data representative of said voice message to said unattended station when said unattended station is conditioned to receive signals; and disconnect means for disconnecting said voice mail system from said unattached station either (a) if said unattended station is not conditioned to receive signals, or (b) subsequent to the transmission of said display data.

2. The apparatus of claim 1 wherein said connection means comprises telephone communication means; said unattended station comprises a telephone station; and said telephone communication means includes telephone dial-out means for dialing a telephone number representing said telephone station.

3. The apparatus of claim 1 wherein said turn-on means includes preface signal generating means for transmitting preface signals to said unattended station, and reply signal detecting means for detecting reply signals returned from said unattended station representing that said unattended station is capable of responding to said activating signals.

4. The apparatus of claim 3 wherein said connection means includes an audio signal channel, and wherein said preface signal generating means comprises preface tone generating means and warning message generating means, the latter being adapted to apprise a human operator of the presence of a voice message awaiting retrieval.

5. The apparatus of claim 4 wherein said turn-on means further includes enable means responsive to the detection of said reply signals for enabling said activating signals to be transmitted.

6. The apparatus of claim 3, further comprising acknowledgment means for detecting acknowledgment signals returned from said unattended station representing that said display data has been successfully received.

7. The apparatus of claim 6, further comprising voice message transmit means responsive to said acknowledgement means for transmitting to said unattended station the voice message awaiting retrieval, such that said voice message may be recorded at the unattended station.

8. The apparatus of claim 7 wherein said voice message transmit means includes sensing means for sensing record completion signals returned from said unattended station when said voice message is recorded thereat, repeat means for repeating said voice message a predetermined number of times if said record completion signals are not sensed from said unattended station, and means for operating said disconnect means in response to said sensing means or said repeat means.

9. A system for delivering priority voice messages dictated in a central dictation system, in which dictated voice messages normally are transcribed to hard copy, to an unattended voice-recording telephone station of an intended recipient by way of voice mail communication apparatus having plural voice mailboxes, said voice-recording telephone station having means for recording voice messages, said system comprising:

a central store for storing dictated voice messages;

priority identifying means for identifying a stored voice message as a priority voice message and for identifying the intended recipient thereof;

priority message control means for directing a priority voice message from said central store to a voice mailbox for transmission to said unattended voice-recording telephone station of said intended recipient;

dial-out means for dialling a telephone number representing said voice-recording telephone station to connect said telephone station to said voice mailbox;

display data transmit means for transmitting to said voice-recording telephone station display data for causing said telephone station to display information identifying a priority voice message;

voice message transmit means for transmitting to said voice-recording telephone station the priority voice message directed to said voice mailbox for recording at said telephone station; and disconnect means for disconnecting said telephone station from said voice mailbox.

10. The system of claim 9 wherein said dial-out means includes tone signal transmit means for transmitting predetermined tone signals to said telephone station, and reply detecting means for detecting reply signals returned from said telephone station representing that said telephone station is a predetermined type.

11. The system of claim 10 wherein said display data transmit means includes activate means for transmitting activating signals to said telephone station to activate said voice message recording means.

12. The system of claim 11 wherein said voice message transmit means includes turn-on detect means for detecting turn-on signals returned from said telephone station representing that said voice message recording means is activated and for intiating transmission of said priority voice message for recording by said recording means.

13. The system of claim 12 wherein said voice message transmit means further includes acknowledgment means for sensing acknowledgment signals returned from said telephone station representing that said priority voice message has been recorded; and repeat means for repeating the transmission of said priority voice message if acknowledgment signals are not sensed.

14. The system of claim 13 wherein said disconnect means is responsive to the absence of reply signals or to the sensing of acknowledgment signals returned from said telephone station to disconnect said telephone station from said voice mailbox.

15. The system of claim 14 wherein said repeat means is operative to repeat the transmission of said priority voice message a predetermined number of times or until said acknowledgment signals are sensed, whichever first occurs, and for activating said disconnect means if said priority voice message has been transmitted said predetermined number of times.

16. A method of apprising an unattended station of the presence of a voice message awaiting retrieval from a voice mail system, comprising the steps of: connecting said voice mail system to said unattended station; transmitting activating signals to said unattended station to attempt to dispose said unattended station in a signal receiving mode of operation; transmitting display data representative of said voice message to said unattended station if and when said unattended station is conditioned to receive signals; and disconnecting said voice mail system from said unattended station either (a) if said unattended station is not conditioned to receive signals, or (b) subsequent to the transmission of said display data.

17. The method of claim 16 wherein said step of transmitting activating signals comprises transmitting preface signals to said unattended station, and detecting reply signals returned from said unattended station representing that said unattended station is capable of responding to activating signals.

18. The method of claim 17 wherein said preface signals comprise preface tones and an audible warning message, the latter being adapted to apprise a human operator of the presence of a voice message awaiting retrieval.

19. The method of claim 18 wherein said display data are transmitted in response to the detection of said reply signals.

20. The method of claim 17, further comprising the step of detecting acknowledgment signals returned from said unattended station representing that said display data has been successfully received.

21. The method of claim 20 further comprising the step of transmitting to said unattended station, if acknowledgment signals are detected, the voice message awaiting retrieval, such that said voice message may be recorded at the unattended station.

22. The method of claim 21 wherein the step of disconnecting includes sensing record completion signals returned from said unattended station when said voice message is recorded thereat, repeating said voice message up to a predetermined number of times if said record completion signals are not sensed from said unattended station, and disconnecting said voice mail system from said unattended station in response to sensed record completion signals or if said voice message has been repeated said predetermined number of times.

* * * * *

UNITED STATES PATENT AND TRADEMARK OFFICE
CERTIFICATE OF CORRECTION

PATENT NO. : 5,033,077
DATED : July 16, 1991
INVENTOR(S) : Bergeron et. al.

It is certified that error appears in the above—identified patent and that said Letters Patent is hereby corrected as shown below:

On the title page: ITEM [75]

Delete as inventors: Paul G. Dulaff, Serge G. Faublas, Dennis S. Howell, Cobern E. McGraw and Mark Sekas.
[73] Delete as assignee: "Pitney Bowes Inc., Stamford, Conn." and replace with -- Dictaphone Corporation, Stratford Conn.--.

Signed and Sealed this

Sixteenth Day of February, 1993

Attest:

STEPHEN G. KUNIN

*Attesting Officer*     Acting Commissioner of Patents and Trademarks